United States Patent
Kendall et al.

(10) Patent No.: US 12,198,044 B2
(45) Date of Patent: Jan. 14, 2025

(54) LEARNING ALGORITHMS FOR OSCILLATORY MEMRISTIVE NEUROMORPHIC CIRCUITS

(71) Applicant: University of Florida Research Foundation, Inc., Gainesville, FL (US)

(72) Inventors: Jack D. Kendall, Millbrae, CA (US); Juan C. Nino, Gainesville, FL (US)

(73) Assignee: University of Florida Research Foundation, Inc., Gainesville, FL (US)

(*) Notice: Subject to any disclaimer, the term of this patent is extended or adjusted under 35 U.S.C. 154(b) by 601 days.

(21) Appl. No.: 16/345,551

(22) PCT Filed: Oct. 27, 2017

(86) PCT No.: PCT/US2017/058816
§ 371 (c)(1),
(2) Date: Apr. 26, 2019

(87) PCT Pub. No.: WO2018/081600
PCT Pub. Date: May 3, 2018

(65) Prior Publication Data
US 2019/0318242 A1    Oct. 17, 2019

Related U.S. Application Data

(60) Provisional application No. 62/413,673, filed on Oct. 27, 2016.

(51) Int. Cl.
*G06N 3/08* (2023.01)
*G06N 3/063* (2023.01)

(52) U.S. Cl.
CPC .............. *G06N 3/08* (2013.01); *G06N 3/063* (2013.01)

(58) Field of Classification Search
CPC .................................. G06N 3/08; G06N 3/063
See application file for complete search history.

(56) References Cited

U.S. PATENT DOCUMENTS 4,926,064 A    5/1990 Tapang
5,446,828 A    8/1995 Woodall
(Continued)

FOREIGN PATENT DOCUMENTS

EP    2230633    9/2010

OTHER PUBLICATIONS

Astaras, Alexander. Pulse-stream binary stochastic hardware for neural computation: the Helmholtz Machine. Diss. University of Edinburgh (Year: 2004).*
(Continued)

*Primary Examiner* — Miranda M Huang
*Assistant Examiner* — Sidney Vincent Bostwick
(74) *Attorney, Agent, or Firm* — Thomas | Horstemeyer, LLP

(57) ABSTRACT

Learning algorithms for oscillatory memristive neuromorphic circuits are described. In one embodiment, a neuromorphic circuit learning network includes a number of neuromorphic circuit nodes, each including a recognition neuron unit and a generative neuron unit. The learning network further includes a plurality of neuromorphic circuit feedforward couplings between the recognition neuron units in the neuromorphic circuit nodes, and a plurality of neuromorphic circuit feedback couplings between the generative neuron units in the neuromorphic circuit nodes. The learning network also includes a learning controller configured to drive activity among the recognition neuron units and train the generative neuron units for learning in one mode and to drive activity among the generative neuron units and train the recognition neuron units for learning in
(Continued)

another mode. Various deep learning algorithms can be implemented in the learning network. Two examples include the wake-sleep algorithm for unsupervised neural networks and target propagation.

19 Claims, 7 Drawing Sheets

(56) References Cited

U.S. PATENT DOCUMENTS

| | | | |
|---|---|---|---|
| 6,581,046 | B1 | 6/2003 | Ahissar |
| 7,280,989 | B1 | 10/2007 | Hoppensteadt et al. |
| 8,433,665 | B2 | 4/2013 | Tang et al. |
| 8,930,291 | B1* | 1/2015 | Srinivasa .............. G06N 3/088 706/15 |
| 9,053,428 | B2 | 6/2015 | Hunzinger et al. |
| 9,087,302 | B2 | 7/2015 | Sim et al. |
| 2010/0220523 | A1 | 9/2010 | Modha et al. |
| 2010/0299296 | A1 | 11/2010 | Modha et al. |
| 2010/0299297 | A1 | 11/2010 | Breitwisch et al. |
| 2011/0004579 | A1 | 1/2011 | Snider |
| 2012/0011090 | A1 | 1/2012 | Tang et al. |
| 2014/0122402 | A1 | 5/2014 | Bichler et al. |
| 2014/0156574 | A1 | 6/2014 | Piekniewski et al. |
| 2016/0004960 | A1* | 1/2016 | Saïghi et al. ........ G06N 3/0635 706/25 |
| 2016/0224890 | A1* | 8/2016 | Friedman ................ G11C 11/54 |

OTHER PUBLICATIONS

Wang, Hanyu, Miao Qi, and Bo Wang. "Study of Memristor-based Oscillatory Neural Networks using PPV modeling." arXiv preprint arXiv:1511.08599 (2015). (Year: 2015).*
Fang, Yan. Hierarchical associative memory based on oscillatory neural network. Diss. University of Pittsburgh, 2013. (Year: 2013).*
Sharma, Abhishek A., James A. Bain, and Jeffrey A. Weldon. "Phase coupling and control of oxide-based oscillators for neuromorphic computing." IEEE Journal on Exploratory Solid-State Computational Devices and Circuits 1 (2015): 58-66. (Year: 2015).*
Gale, Ella, Ben de Lacy Costello, and Andrew Adamatzky. "Observation of spontaneous bursting spike patterns in simple three memristor circuits." 2013 European Conference on Circuit Theory and Design (ECCTD). IEEE, 2013. (Year: 2013).*
Abdoli, Behrooz, et al. "A novel CMOS-memristor based inverter circuit design." 2014 22nd Iranian conference on electrical engineering (ICEE). IEEE, 2014. (Year: 2014).*
International Search Report and Written Opinion for PCT/US2017/58816, mailed Jan. 26, 2018.
Astaras "Pulse-stream binary stochastic hardware for neural computation: the Helmholtz Machine." A thesis submitted for the degree of Doctor of Philosophy, The University of Edinburgh (pp. 1-40, 150-176), Sep. 13, 2004 [online] [retrieved on Dec. 27, 2017 (Dec. 27, 2017)] Retrieved from the Internet <URL: https://www.era.lib.ed.ac.uk/handle/1842/11620>, entire document, especially Abstract; Figure 4, 5; pp. 23-33, 154-155, 172.
Pantazi et al. "All-memristive neuromorphic computing with level-tuned neurons" In: Nanotechnology 27 (2016), Jul. 26, 2016 [online] [retrieved on Dec. 27, 2017(Dec. 27, 2017)] Retrieved from the Internet <URL: http://iopscience.iop.org/article/10.1088/0957-4484/27/35/355205/meta>, entire document.
Kee et al. "Feed-Forward versus Feedback Inhibition in a Basic Olfactory Circuit" In: PLoS Comput Biol 11(10):, Oct. 15, 2015 [online] [retrieved on Dec. 27, 2017 (Dec. 27, 2017)] Retrieved from the Internet <URL: http://journals.plos.org/ploscompbiol/article?id=10.1371/journal.pcbi. 1004531 >, entire document.
Extended European Search Report for EP Application No. 17863428.3 mailed May 26, 2020.
F. Hoppensteadt; et al (2000) "Pattern Recognition via Synchronization in Phase-Locked Loop Neural Networks." IEEE Transactions on Neural Networks, 11(3), pp. 734-738.
W. Gerstner; et al (1993) "Why Spikes? Hebbian Learning and Retrieval of Time-Resolved Excitation Patterns" Biol. Cybern. 69, pp. 503-515.
T. Masquelier; et al (2008) "Spike Timing Dependent Plasticity Finds the Start of Repeating Patterns in Continuous Spike Trains" PLoS One 3(1): e1377 pp. 1-9.
T. Masquelier; et al (2009) "Competitive STDP-Based Spike Pattern Learning" Neural Computation 21, pp. 1259-1276.
G. Bi; et al (1998) "Synaptic Modifications in Cultured Hippocampal Neurons: Dependence on Spike Timing, Synaptic Strength, and Postsynaptic Cell Type" The Journal of Neuroscience 18(24):pp. 10464-10472.
B. Linares-Barranco; et al (2009) "Memristance can explain Spike-Time-Dependent-Plasticity in Neural Synapses" pp. 1-4.
D. Strukov; et al (2008) "The Missing Memristor Found" Nature, 453(7191), pp. 80-83.
J. Borghetti; et al (2009) "A Hybrid Nanomemristor/Transistor Logic Circuit Capable of Self-Programming" PNAS, 106(6), pp. 1699-1703.
S. Jo; et al (2008) "High-Density Crossbar Arrays Based on a Si Memristive System" Nano Lett., 9(2), pp. 870-874.
L. Chua (1971) "Memristor—The Missing Circuit Element" IEEE Transactions on circuit theory, 18(5), pp. 507-519.
G. Snider (2008) "Spike-Timing-Dependent Learning in Memristive Nanodevices." In Proceedings of the 2008 IEEE International Symposium on Nanoscale Architectures (pp. 85-92). IEEE Computer Society.
D. Strukov; et al (2005) "CMOL FPGA: A Reconfigurable Architecture for Hybrid Digital Circuits With Two-Terminal Nanodevices" Nanotechnology 16, pp. 888-900.
R. Serrano-Gotarredona; et al (2006) "A Neuromorphic Cortical-Layer Microchip for Spike-Based Event Processing Vision Systems" IEEE Transactions on Circuits and Systems—I: Regular Papers, 53(12), pp. 2548-2566.
R. Serrano-Gotarredona; et al (2008) "On Real-Time AER 2-D Convolutions Hardware for Neuromorphic Spike-Based Cortical Processing" IEEE Transactions On Neural Networks, 19(7), pp. 1196-1219.
P. Lichtsteiner; et al (2008) "A 128$\times$ 128 120 dB 15$\mu $ s Latency Asynchronous Temporal Contrast Vision Sensor." IEEE journal of solid-state circuits, 43(2), pp. 566-576.
M. Oster; et al (2008) "Quantification of a Spike-Based Winner-Take-All VLSI Network" IEEE Transactions on Circuits and Systems—Part I: Regular Papers, 55(10), pp. 3160-3169.
R. Serrano-Gotarredona; et al (2009) "CAVIAR: A 45k Neuron, 5M Synapse, 12G Connects/s AER Hardware Sensory-Processing-Learning-Actuating System for High-Speed Visual Object Recognition and Tracking" IEEE Transactions on Neural Networks, 20(9), pp. 1417-1438.
A. Afifi; et al (2009) "STDP Implementation Using Memristive Nanodevice in CMOS-Nano Neuromorphic Networks." IEICE Electronics Express, 6(3), pp. 148-153.
S. Jo; et al (2010) "Nanoscale Memristor Device as Synapse in Neuromorphic Systems" Nano Lett. 10, pp. 1297-1301.
G. Hinton; et al (1995) "The Wake-Sleep Algorithm for Unsupervised Neural Networks" Science, 268(5214), pp. 1158-1161.
J. Bill; et al (2015) "Distributed Bayesian Computation and Self-Organized Learning in Sheets of Spiking Neurons with Local Lateral Inhibition." PLoS One 10(8), pp. 1-51.
P. Dayan; et al (1995) "The Helmholtz Machine." Neural computation, 7(5), pp. 889-904.
P. Dayan (2000) "Helmholtz Machines and Wake-Sleep Learning." Handbook of Brain Theory and Neural Network. MIT Press, Cambridge, MA, 44(0), pp. 1-12.
P. Sountsov; et al (2015) Spiking neuron network Helmholtz machine. Frontiers in computational neuroscience,vol. 9, Article 46, pp. 1-24.
D. Feldman, (2009) "Synaptic Mechanisms for Plasticity in Neocortex." Annual Review of Neuroscience, 32, pp. 33-55.
G. Koch; et al (2013) "Hebbian and Anti-Hebbian Spike-Timing-Dependent Plasticity of Human Cortico-Cortical Connections." Journal of Neuroscience, 33(23), pp. 9725-9733.
Freeman; et al (2008) "Freeman K-Set." Scholarpedia, 3(2), p. 3238.

(56) References Cited

OTHER PUBLICATIONS

Y. Pershin; et al (2010) "Experimental Demonstration of Associative Memory With Memristive Neural Networks." Neural Networks, 23(7), pp. 881-886.
D.O. Hebb (1949) "Th Organization of Behavior: A Neuropsychological Theory" John Wiley & Sons, Inc., New York.

* cited by examiner

LEARNING ALGORITHMS FOR OSCILLATORY MEMRISTIVE NEUROMORPHIC CIRCUITS

CROSS-REFERENCE TO RELATED APPLICATIONS

This application is a 35 U.S.C. § 371 national stage application of PCT Application No. PCT/US2017/058816, entitled "LEARNING ALGORITHMS FOR OSCILLATORY MEMRISTIVE NEUROMORPHIC CIRCUITS," filed Oct. 27, 2017, which claims the benefit of priority to U.S. Provisional Application No. 62/413,673, filed Oct. 27, 2016, the entire contents of both of which applications are hereby incorporated herein by reference.

BACKGROUND

A memristor is a passive non-linear two-terminal electrical component. In a memristor, the electrical resistance of the device depends on a history of current that previously flowed through the device. Thus, the resistance or impedance of a memristor at any given time depends on how much electric charge flowed through the memristor, and in what direction, previously.

The use of memristors for synaptic networks has been proposed as a promising approach in the field of neuromorphic circuit development. Memristors have been incorporated into crossbar synapse networks with complementary metal oxide semiconductor (CMOS)-based circuitry for presynaptic and postsynaptic voltage control. Those circuits demonstrate that CMOS-based voltage and current control can be used to generate changes in the resistance or impedance (e.g., memory) of memristors.

SUMMARY OF THE INVENTION

In one example embodiment, a neuromorphic circuit learning network includes a plurality of neuromorphic circuit nodes, wherein each neuromorphic circuit node includes a recognition neuron unit and a generative neuron unit. The network further includes a number of neuromorphic circuit feedforward couplings between the recognition neuron units in the neuromorphic circuit nodes, and a number of neuromorphic circuit feedback couplings between the generative neuron units in the neuromorphic circuit nodes. A learning controller is configured, in a first mode, to drive activity among the recognition neuron units through the neuromorphic circuit feedforward couplings and train the generative neuron units for learning through the neuromorphic circuit feedback couplings. The learning controller is further configured, in a second mode, to drive activity among the generative neuron units through the neuromorphic circuit feedback couplings, and train the recognition neuron units for learning through the neuromorphic circuit feedforward couplings.

In various examples, the neuromorphic circuit feedforward couplings and the neuromorphic circuit feedback couplings can include one or more memristors. The memristors can include a long-term potentiation (LTP) memristor arranged in parallel with a long-term depression (LTD) memristor, and the feedforward and feedback couplings can also include a difference amplifier that generates a difference signal based on a difference between output signals from the LTP memristor and the LTD memristor.

In another embodiment, a method of training a neuromorphic circuit learning network includes, in a first mode, driving activity among recognition neuron units in a plurality of neuromorphic circuit nodes through feedforward couplings in the plurality of neuromorphic circuit nodes. The method further includes training generative neuron units in the plurality of neuromorphic circuit nodes for learning through feedback couplings in the plurality of neuromorphic circuit nodes.

In a second mode, the method further includes driving activity among the generative neuron units in the plurality of neuromorphic circuit through the feedback couplings, and training the recognition neuron units for learning through the feedforward couplings.

In other aspects, the neuromorphic circuit nodes can form a number of layers in the neuromorphic circuit learning network, and the method can further include showing a training example to a lowest layer in the neuromorphic circuit learning network in the first mode. The method can also include showing a random vector to a highest layer in the neuromorphic circuit learning network in the second mode.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Figure 1B:
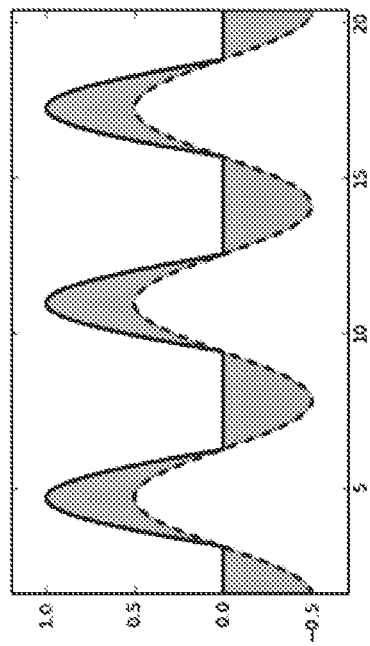
FIGS. 1A and 1B illustrate examples of voltage signals that can be used for memristive learning according to various examples described herein.

As noted above, the use of memristors for synaptic networks has been proposed in the field of neuromorphic circuit development. Memristors have been incorporated into crossbar synapse networks, for example, with complementary metal oxide semiconductor (CMOS)-based circuitry for presynaptic and postsynaptic voltage control. Those circuits demonstrate that CMOS-based voltage and current control can be used to generate changes in the resistance or impedance (e.g., memory) of memristors.

The concepts described herein are directed to hardware-based neural networks (e.g., neuromorphic circuits and hardware) using memristive synapses and oscillatory neurons and method for training such networks. The approach is localized and does not require external circuits for weight updates, pulse generation, or event detection. The goal of the learning rules described herein is to approximate the delta rule used for training neural networks. In machine learning, the delta rule is a gradient descent learning rule for updating the weights of the inputs to artificial neurons in a single-layer neural network.

For linear neurons, the delta rule has the following form:

$$\Delta w_{ji} = \alpha(t_j - y_j)x_i \quad (1)$$

In Equation (1), $\Delta w_{ji}$ is the change in the weight from neuron i to neuron j, $\alpha$ is a constant learning rate, $t_j - y_j$ is the error of neuron j, with $y_j$ its actual output and $t_j$ its target output, and $x_i$ is the output of neuron i.

If the actual output of neuron j is less than its target, the weight update is positive. This would effectively increase the output of neuron j if shown the same input again, decreasing the error. Similarly, if the actual output is greater than its target, the weight update is negative. This makes intuitive sense, because the weights should be updated to minimize the magnitude of the error.

Different types of neurons with different activation functions will yield different versions of the delta rule. However, the dependence on the error $t_j - y_j$ remains the same, and is the most critical part of the rule. Therefore, approximations to the delta rule preserve the dependence on the error $t_j - y_j$.

Whereas standard rate-based neurons can represent only real-valued numbers in the form of currents or voltages, oscillatory-based neurons are capable of representing complex-valued numbers with both magnitude and phase. The learning concepts described herein use the magnitude of the oscillation of an oscillatory-based neuron to transmit information to other oscillatory-based neurons, representing $x_i$ and $y_j$ while the phase of the oscillation is used to modify its connection strength to the other oscillatory-based neurons.

The oscillatory signals of two neurons can be used to update the connection weight between them by exploiting a property of memristors known as the threshold voltage. Below the threshold voltage of a memristor, no change in resistance (and thus weight) occurs. Above this threshold, however, the resistance will either increase or decrease depending on the direction (e.g., polarity) of the voltage drop across the memristor. This property has been exploited in spiking neuron models to implement spike-timing-dependent plasticity (STDP). However, an analogous rule for oscillatory, phase-based neuron models has yet to be described.

Figure 1A:
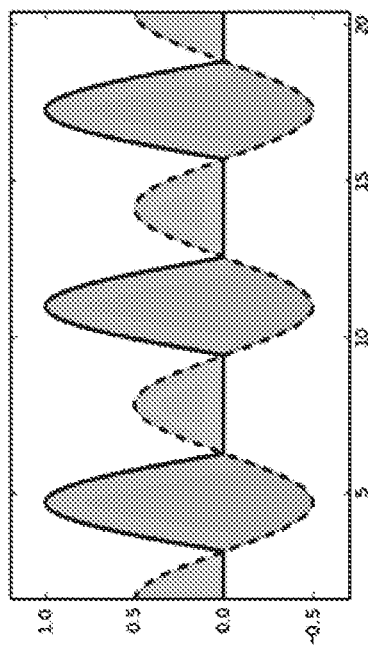

FIGS. 1A and 1B illustrate examples of voltage signals that can be used for memristive learning according to various examples described herein. In FIGS. 1A and 1B, two voltage signals generated by two different oscillators are superimposed. The voltage signals respectively correspond to voltages at opposite ends of a memristor (i.e., pre- and post-memristor ends) over time. The pre-memristor synaptic voltage signal is a rectified sine wave (solid line), while the post-memristor synaptic voltage signal is an unrectified sine wave (dashed line).

In FIG. 1A, the pre- and post-memristor voltage signals are in-phase. The maximum voltage drop across the memristor in that case is 0.5 V, which can be below the threshold voltage of the memristor. Thus, no change in resistance occurs in the memristor. In FIG. 1B, the pre- and post-memristor voltage signals are out-of-phase. The maximum voltage drop across the memristor in that case is 1.5 V, which can be greater than the threshold voltage of memristor. Thus, a change in resistance occurs in the memristor for the FIG. 1B case but not the FIG. 1A case. Under this construct, whether or not the weight (e.g., operating characteristic or resistance of the memristor) is changed or updated depends on the relative phases of the pre- and post-memristor voltages. This shows that memristance can be changed by changing the relative phase between the two oscillators or oscillatory-based neurons, analogous to STDP.

In a typical feed-forward neural network, the activities of the neurons are not influenced by the immediate error or future weight updates. Because of this, it is important that the activity of a particular neuron not be influenced by its error, or by the direction in which its weights are changing at a given time. Therefore, in the proposed learning concepts, the magnitude of the oscillation of an oscillatory-based neuron, which determines activity, can be controlled independently of the phase of the oscillation of the oscillatory-based neuron, which governs learning, and is guided by the error.

If either the pre- or post-memristor voltage signals shown in FIGS. 1A and 1B is applied across a memristor, it can be shown that the total current through the memristor is independent of the phase difference between the voltage signals shown in FIGS. 1A and 1B. This can be understood by observing FIGS. 1A and 1B. To satisfy the above criterion, the current flowing from the pre-synaptic neuron to the post-synaptic neuron should be independent of the relative phases of the two oscillatory-based neurons. This can be conveniently achieved by adding a leaky integrator, low pass filter, or moving average filter immediately after the synaptic memristor, before entering the post-synaptic oscillatory-based neuron. Since the integral of a pure sine wave is zero, only the rectified sine wave from the presynaptic neuron will contribute to the current flowing into the postsynaptic neuron. In other words, since the integrals of the post-memristor voltage signals (dashed line) shown in both FIG. 1A and FIG. 1B are the same, the total current will be the same regardless of which pair of the signals shown in FIG. 1A and FIG. 1B is applied across the memristor, independent of the relative phases of the pair of the signals.

Thus, it can been demonstrated that the strength of a memristive connection can be altered by adjusting the relative phase of two oscillatory-based neurons, and that the total input from one oscillatory-based neuron into the other is independent of this relative phase. Based on that finding, an architecture to implement an efficient approximation to the delta rule is described below.

Figure 2A:
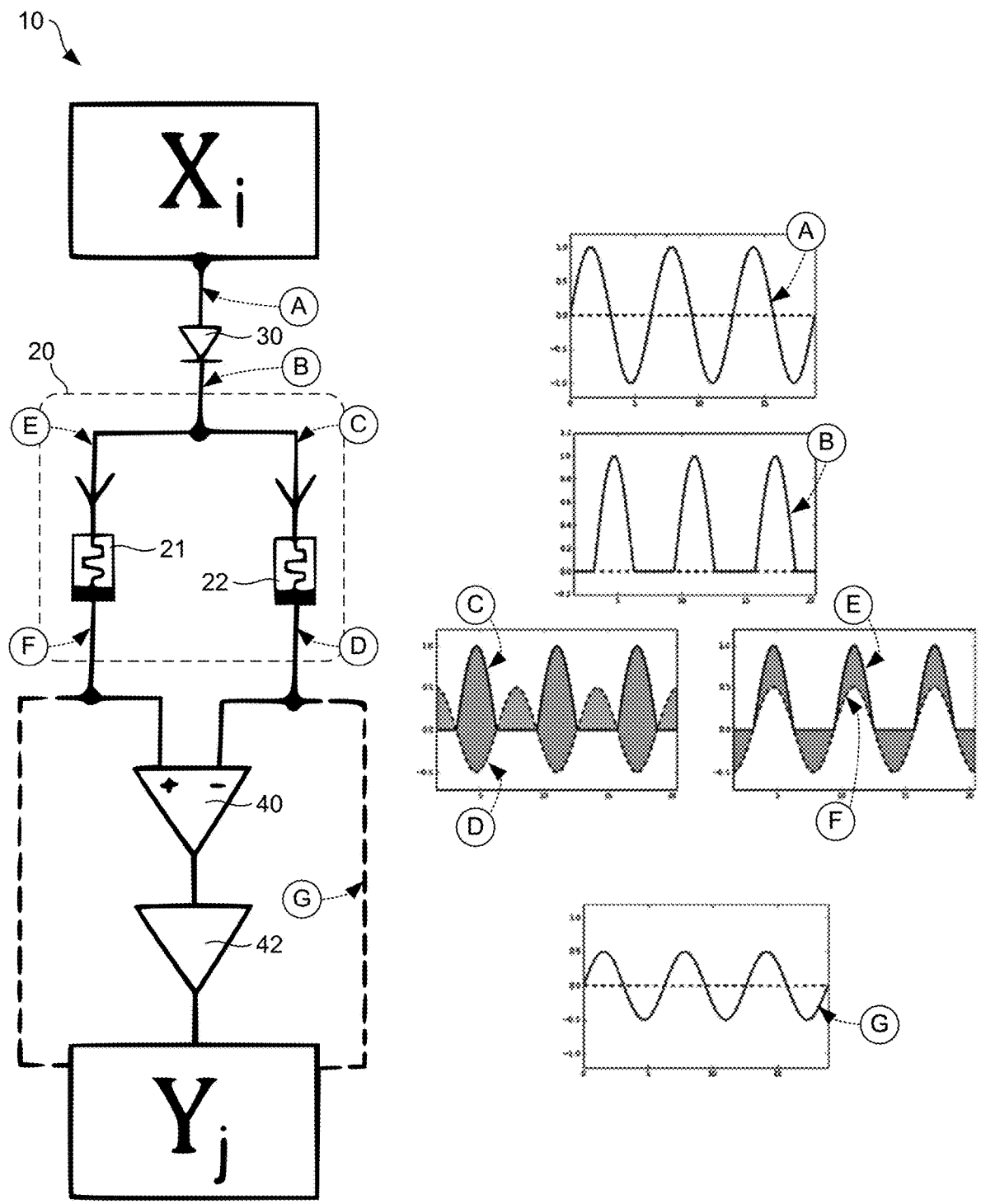
FIGS. 2A-2B illustrate an example neuromorphic circuit that incorporates the concepts of memristive learning and exemplary oscillators according to various examples described herein.
Figure 2B:
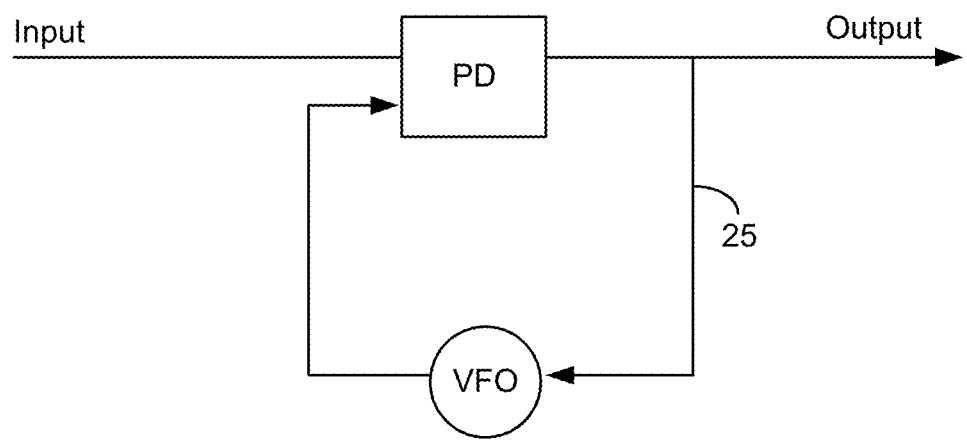

FIG. 2A illustrates an example neuromorphic circuit 10 that incorporates the concepts of memristive learning according to various examples described herein. As shown in FIG. 2A, the architecture can be understood by observing two oscillators, $X_i$ and $Y_j$, which are representative of two different neurons. The oscillators $X_i$ and $Y_j$ can be embodied as any suitable type of oscillator, such as a phase-locked loop. Thus, the oscillators $X_i$ and $Y_j$ can include a control system that generates an output signal having a phase related to the phase of an input signal. As one example, as shown in FIG. 2B, the oscillators $X_i$ and $Y_j$ can include a variable frequency oscillator (VFO) and a phase detector (PD) coupled in a feedback control loop 25. The oscillator can generate a periodic, oscillating output signal, and the phase detector can compare the phase of the output signal with the phase of a periodic input signal. The output of the phase detector can be provided as an input to the variable frequency oscillator to keep the phases of the input and output signals matched.

The two oscillatory-based neurons $X_i$ and $Y_j$ are coupled by a synapse 20 comprising two memristors 21 and 22. The voltage output from both the oscillatory-based neurons $X_i$ and $Y_j$ are assumed in one example to be pure sine waves (e.g., see the A and G waveforms in FIG. 2A), although other waveforms could be used. In the structure shown in FIG. 2A, the post-synaptic oscillatory-based neuron $Y_j$ receives input from the presynaptic oscillatory-based neurons $X_i$. Additionally, the memristors 21 and 22 are representative of a synapse that presents connection "weights" between the two oscillatory-based neurons X, and Y. The two memristors 21 and 22 represent a single synapse and allow for both positive and negative connections as described below.

In various embodiments, the memristors 21 and 22 can be embodied as any suitable memristor having a threshold voltage that regulates the flow of electrical current based on or in accordance with the amount of charge that has previously flowed through it. For example, the electrical resistance of each of the memristors 21 and 22 is not constant but depends on a history of the amount of current that had previously flowed through each of them. Thus, the resistance of each of the memristors 21 and 22, at any given time, depends on how much electric charge has previously flowed through the device, and in what direction.

One of the memristors 21 and 22 in the synapse 20 can be designated the long-term potentiation (LTP) memristor, and the other can be designated the long-term depression (LTD) memristor. By increasing the conductance of the LTP memristor, the connection strength between the two oscillators $X_i$ and $Y_j$ is strengthened. On the other hand, by increasing the conductance of the LTD memristor, the connection between the two oscillators $X_i$ and $Y_j$ is weakened.

A diode 30 is provided at the output of the oscillatory-based neuron $X_i$. The diode 30 rectifies the sine wave output of the oscillator $X_i$ as shown in the B waveform in FIG. 2A. This rectified signal is then passed to the synapse 20 comprising the two memristors 21 and 22. The memristors 21 and 22 in the synapse 20 also receive separate post-memristor sinusoidal feedback signals based on the error of the oscillatory-based neuron $Y_j$. These feedback signals then modify the resistance of one of the memristors 21 and 22 by changing their phase, depending on whether the synapse 20 is to be strengthened or weakened.

After the synapse 20, the difference in current flowing between the two memristors 21 and 22 can be determined by a difference amplifier 40 and provided as a difference feedback signal. The output of the difference amplifier 40 can be passed to a low-pass filter 42 which integrates the difference feedback signal and eliminates the effects of phase differences between the input and feedback signals. The relatively constant current from the low-pass filter 42 is then provided as input to the oscillatory-based neuron Yj.

The neuromorphic circuit 10 uses a two-memristor synapse 20 rather than a single-memristor synapse for two reasons. The first reason is that a two-memristor synapse allows for the practical implementation of both positive and negative weights. By having one memristor (e.g., the LTD memristor) act as a negative weight and the other memristor (e.g., the LTP memristor) act as a positive weight, the currents through each can be subtracted to give a current which is either positive or negative.

The second reason is that the proposed learning concepts allow for only one of the two memristors 21 and 22 to be either strengthened or weakened at a time, depending on how the voltage at $X_i$ is rectified. Having both a positive and a negative memristor allows the synapse 20 be strengthened by simply strengthening the positive memristor. On the other hand, the synapse 20 can be weakened by strengthening the negative memristor.

To prevent the saturation of both the memristors 21 and 22 from constant strengthening, the direction of the voltage rectification (e.g., of the diode 30) can be changed while simultaneously inverting the current from the oscillatory-based neurons $X_i$ and $Y_j$. In this way, the dynamics remain the same, however each of the memristors 21 and 22 is now being weakened rather than strengthened. Alternating these two regimes can then prevent saturation.

Figure 3:
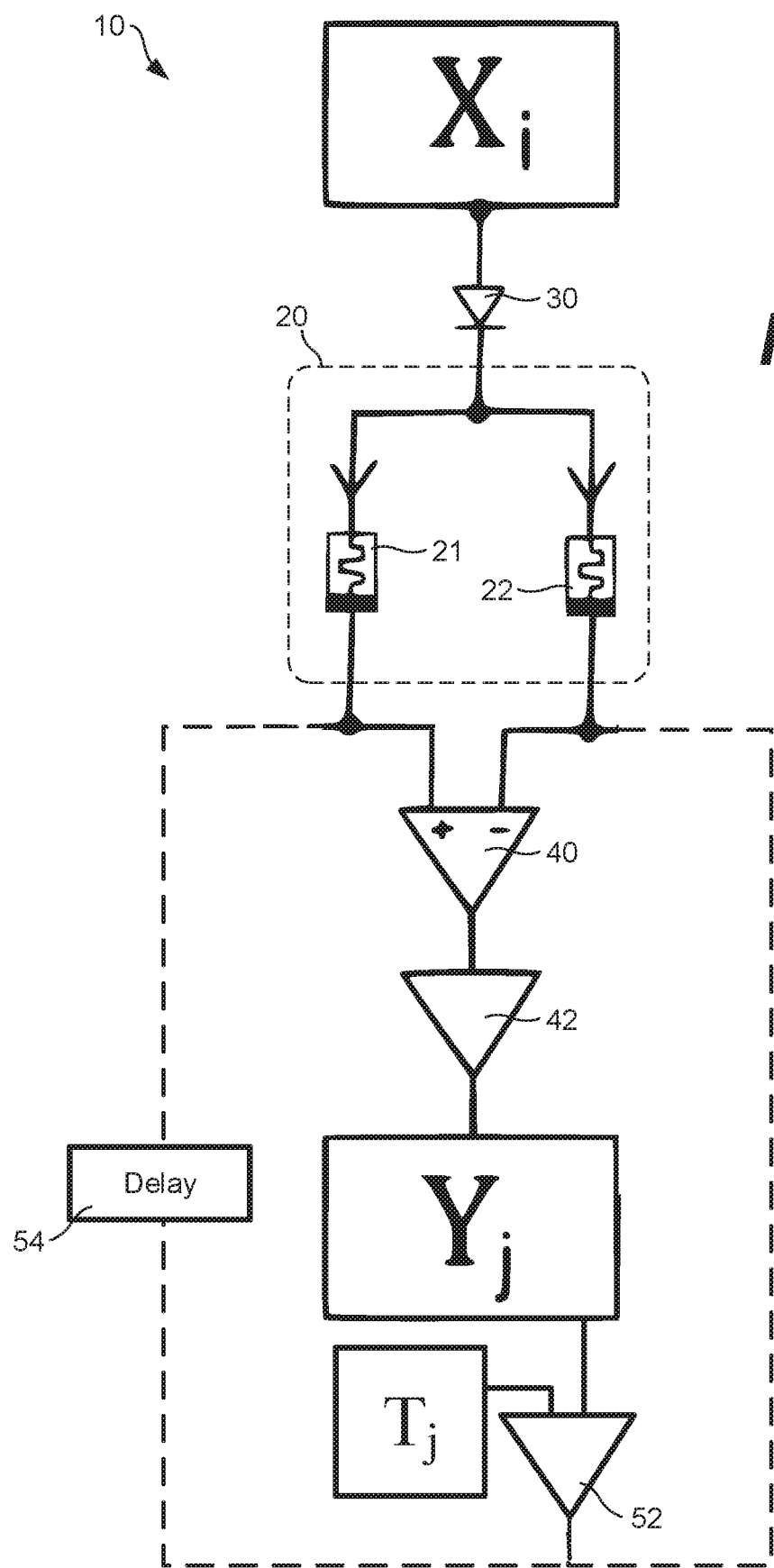
FIG. 3 further illustrates the example neuromorphic circuit shown in FIG. 2A according to various examples described herein.

FIG. 3 further illustrates the example neuromorphic circuit 10 shown in FIG. 2A. To update the connection "weights" between the two oscillatory-based neurons $X_i$ and $Y_j$, the comparator 52 determines the difference between the target output, $T_j$, and the actual output $Y_j$. The output of the comparator 52 is representative of an error between the target output and the actual output $Y_j$. If this is positive, the feedback signal to the negative memristor 22, for example, remains in phase with its input signal, while the feedback signal to the positive memristor 21, for example, is passed through a delay stage 54 such that it is anti-phase (i.e., opposite in phase) with its input signal. This will therefore strengthen the synapse 20 as required by the delta rule. In the opposite case, where the difference between $T_j$ and $Y_j$ is negative, the feedback signal to the positive memristor 21 remains in phase, while the feedback signal to the negative memristor 22 becomes anti-phase. In this way, the magnitude of the error for each training case will decrease, so long as the learning rate α is sufficiently low. As long as the input signals are synchronized, this can be generalized to the case of multiple input units and multiple output units.

Turning to learning algorithms, various types of deep learning algorithms can be implemented in neuromorphic circuit hardware using the oscillatory-based memristive learning concepts described above. Two examples of those algorithms include the wake-sleep algorithm for unsupervised neural networks and target propagation for supervised neural networks. The target propagation approach is an efficient approximation to the backpropagation algorithm. Each of these algorithms utilize a purely local delta rule for weight updates and, thus, are compatible with the oscillatory-based memristive learning concepts described above. Before turning to a more detailed discussion of the learning algorithms, an example neuromorphic circuit network including the concepts described above is introduced for context.

Figure 4:
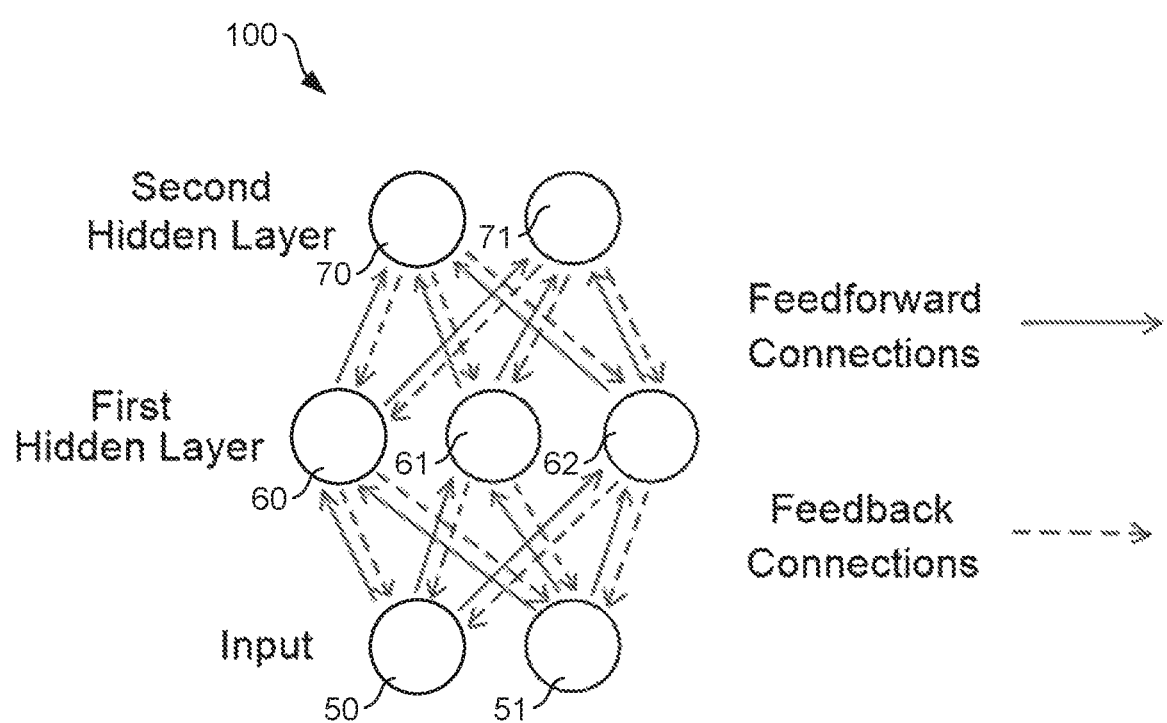
FIG. 4 illustrates an example neuromorphic circuit network according to various examples described herein.

FIG. 4 illustrates an example neuromorphic circuit network 100 according to various examples described herein. The neuromorphic circuit network 100 includes a first or input layer of nodes 50 and 51, a first hidden layer of nodes 60-62, and a second hidden layer of nodes 70 and 71. The network 100 is representative and, in other cases, other neuromorphic circuit networks can include any other suitable number of layers and nodes per layer.

As described in further detail below with reference to FIG. 5, each of the nodes 50, 51, 60-62, 70, and 71 can include a pair of oscillatory-based neurons or units, similar to the oscillatory-based neurons or units $X_i$ and $Y_j$ shown in FIGS. 2 and 3. One of the oscillatory-based neurons is described as a "recognition" neuron or unit and comprises part of a feedforward network in the neuromorphic circuit network 100. The other one of the oscillatory-based neurons is described as a "generative" neuron or unit and comprises part of a feedback network in the neuromorphic circuit network 100. As described above, each of the oscillatory-based neurons carries a level of activity encoded as an amplitude and an error for learning encoded as a phase.

The neuromorphic circuit network 100 also includes a number of neuromorphic circuit feedforward 80 and 81 (among others) and feedback couplings 90 and 91 (among others) as shown in FIG. 4. Particularly, the neuromorphic circuit network 100 includes a number of neuromorphic circuit feedforward couplings between the recognition neurons in the nodes 50, 51, 60-62, 70, and 71. Each of the feedforward couplings can be embodied as a neuromorphic circuit synapse comprising a pair of memristors similar to the neuromorphic circuit synapse 20 shown in FIGS. 2 and 3. Additionally, the neuromorphic circuit network 100 includes a number of neuromorphic circuit feedback couplings between the generative neurons in the nodes 50, 51, 60-62, 70, and 71. Each of the feedback couplings can be embodied as a neuromorphic circuit synapse similar to the neuromorphic circuit synapse 20 shown in FIGS. 2 and 3.

Figure 5:
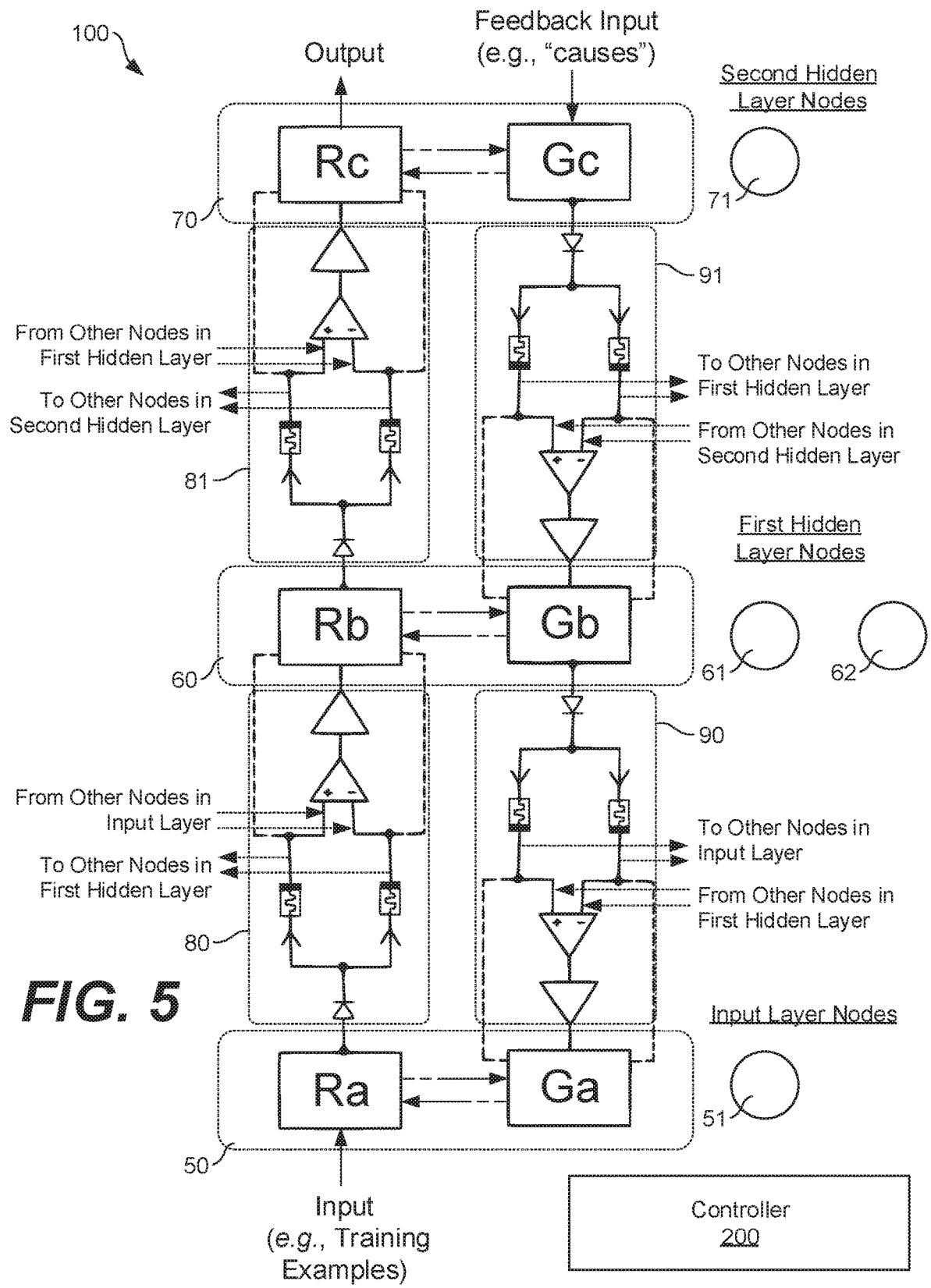
FIG. 5 illustrates a portion of the neuromorphic circuit network shown in FIG. 4 according to various examples described herein.

FIG. 5 illustrates a portion of the neuromorphic circuit network 100 shown in FIG. 4 according to various examples described herein. FIG. 5 illustrates the oscillatory-based recognition Ra and generative Ga neurons in the node 50 of the input layer, the recognition Rb and generative Gb neurons in the node 60 of the first hidden layer, and the recognition Rc and generative Gc neurons in the node 70 of the second hidden layer. Again, the network 100 is representative and, in other cases, can include any suitable number of layers and nodes per layer.

As shown in FIG. 5, the neuromorphic circuit network 100 also includes a number of feedforward couplings between the recognition neurons Ra, Rb, and Rc (and other recognition neurons in other nodes). Each of the feedforward couplings can be embodied as a neuromorphic circuit synapse comprising a pair of memristors and other circuit elements as described above with reference to FIGS. 2 and 3. To account for the inter-connected-layer node structure of the neuromorphic circuit network 100, the neuromorphic circuit feedforward synapses can be structured to electrically couple activity (e.g., amplitude) from each preceding-level node to each following-level node. In FIG. 5, some of these feedforward connections are drawn in representative fashion using dotted lines. The activity input to any given recognition neuron can thus be formed as a type of combined or integrated level of activity from all the recognition neurons in the preceding-level nodes.

The neuromorphic circuit network 100 also includes a number of feedback couplings between the generative neurons Gc, Gb, and Ga (and other generative neurons in other nodes). Each of the feedback couplings can be embodied as a neuromorphic circuit synapse comprising a pair of memristors and other circuit elements as described above with reference to FIGS. 2 and 3. Again, to account for the inter-connected-layer node structure of the neuromorphic circuit network 100, the neuromorphic circuit feedback synapses can be structured to electrically couple activity (e.g., amplitude) from each preceding-level node to each following-level node. In FIG. 5, some of these feedback connections are drawn in representative fashion using dotted lines. The activity input to any given generative neuron can thus be formed as a type of combined or integrated level of activity from all the generative neurons in the preceding-level nodes.

The neuromorphic circuit network 100 also includes a controller 200 that coordinates the operations of the neuromorphic circuit network 100 as described herein. The controller 200 can be embodied as any suitable processing circuit or circuits, including one or more state machines, programmable gate arrays, general purpose processors, application specific integrated circuits, or other processing circuits, including associated memory devices, to coordinate the algorithms described herein.

With reference to the neuromorphic circuit network 100, the wake-sleep algorithm proceeds in a number of wake and sleep phases or modes over time. In the wake phase, training examples are shown to the lowest layer in the network (e.g., nodes 50, 51, etc.) and the activity of each of the recognition neurons Ra, Rb, and Rc, which can be encoded as an amplitude in each of the recognition neurons Ra, Rb, and Rc, is driven up the neuromorphic circuit network 100 through the feedforward couplings.

During the wake phase, each of the generative neurons Gc, Gb, and Ga are also trained for learning. The generative neuron Gc is trained for learning using the delta rule described herein based on the activity level of the recognition neuron Rc, with the recognition neuron Rc acting as the target for training. Similarly, the generative neuron Gb is trained for learning based on the activity level of the recognition neuron Rb, with the recognition neuron Rb acting as the target for training, and the generative neuron Ga is trained for learning using based on the activity level of the recognition neuron Ra, with the recognition neuron Ra acting as the target for training.

As a more particular example of training the generative neuron Gb for learning, if the activity level of the generative neuron Gb is lower (e.g., lower in amplitude) than the recognition neuron Rb, then the generative neuron Gb is trained (i.e., adjusted in phase) so that the feedback couplings with preceding-level generative neurons having lower levels of activity are strengthened and/or the feedback couplings with preceding-level generative neurons having higher levels of activity are weakened. On the other hand, if the activity level of the generative neuron Gb is higher (e.g., higher in amplitude) than the recognition neuron Rb, then the generative neuron Gb is trained (i.e., adjusted in phase) so that the feedback couplings with preceding-level generative neurons having higher levels of activity are strengthened and/or the feedback couplings with preceding-level generative neurons having lower levels of activity are weakened.

During sleep phase, the opposite of the wake phase occurs. A random vector of causes is shown to the highest layer in the network, and the generative neurons Gc, Gb, and Ga are used to drive activity down the neuromorphic circuit network 100. Then, the recognition neurons Ra, Rb, and Rc are trained to reproduce this activity in the neuromorphic circuit network 100.

Instead of using comparators and delay stages to compute the error at each stage, however, two separate and complementary neural networks are used in the neuromorphic circuit network 100. The complementary neural networks govern the recognition and generative pathways. Thus, the wake-sleep algorithm can be implemented using the neuromorphic circuit network 100 shown in FIGS. 4 and 5, with the recognition and generative units acting as targets for one another, depending on whether the network is in the wake or the sleep phase. The weights associated with the neuromorphic circuit synapses can then be updated according to the oscillatory-based memristive learning rule described above with reference to FIGS. 2 and 3 (e.g., by encoding information into the phases of the neurons to adjust the synapse connection weights).

Beyond the wake-sleep algorithm, target propagation is a supervised learning algorithm which aims to serve as a local approximation to the backpropagation algorithm. Since the delta rule is designed for single-layer neural networks, its generalization, backpropagation, can be used for multi-layer or deep neural networks. However, backpropagation is not a local learning algorithm, and it is therefore not ideal for neuromorphic circuits. Much like in real brains, a learning algorithm is most simple when each weight only needs information from the two neurons it is connecting in neuromorphic circuits. This is the essence of "locality" in a learning algorithm. Target propagation efficiently approximates the backpropagation algorithm while maintaining this locality.

To understand target propagation, it can be helpful to understand how the backpropagation algorithm works. For the last layer in a multi-layer neural network, the weight update rule is identical to the delta rule, because the actual targets for the network are immediately available. However, for the middle or "hidden" layers, it is not obvious how these neurons affect the total squared error, which the network attempts to minimize. Thus it is not possible to know whether to increase or decrease their activity.

An important metric for changing the weights in hidden layer neurons is the contribution to error caused by or due to those hidden layer neurons. For example, if the activity of a hidden layer neuron is increased, does that change increase or decrease the total squared error? If it decreases the error, the weight or balance of activity into that neuron should be increased, as that would decrease the total squared error. If it increases the error, the weight or balance of activity into that neuron should be decreased. Thus, backpropagation works by analytically calculating these contributions by taking derivatives with respect to the total squared error.

In target propagation, these contributions to the total squared error are estimated. This is done by using a separate, single-layer feedback network which operates using the delta rule at each hidden layer. This network is trained to invert the weights of the forward, or primary network so that it becomes an efficient estimator of each hidden layer neuron's contribution to the total squared error. This is possible, because the actual contribution to the error only depends on the neuron's feedforward weights and the error of each neuron in the output or target layer. If the error is sent back through the feedback weights, which invert the feedforward weights, this will give a good approximation to the contribution to the error for each neuron in the hidden layer or layers. After the contribution to the error is calculated, this can be used as a new target for the hidden layer neurons, which can then be trained using the delta rule. This process is then repeated for each hidden layer in the network until the entire network is trained.

This algorithm can be implemented using the same technique as described above for the wake-sleep algorithm, with the exception that instead of passing back the activity in the layer above, the error in the layer above is passed back. To train the feedback weights to invert the feedforward weights, the network can be trained as an autoencoder. That is, the output layer is shown a set of targets, the activity is passed through the feedback weights, and then the activity is passed back through the feedforward weights to get a "reconstruction" of the targets. The feedback weights are then trained according to the delta rule using the reconstruction as $Y_j$ and the original targets as $T_j$.

Figure 6:
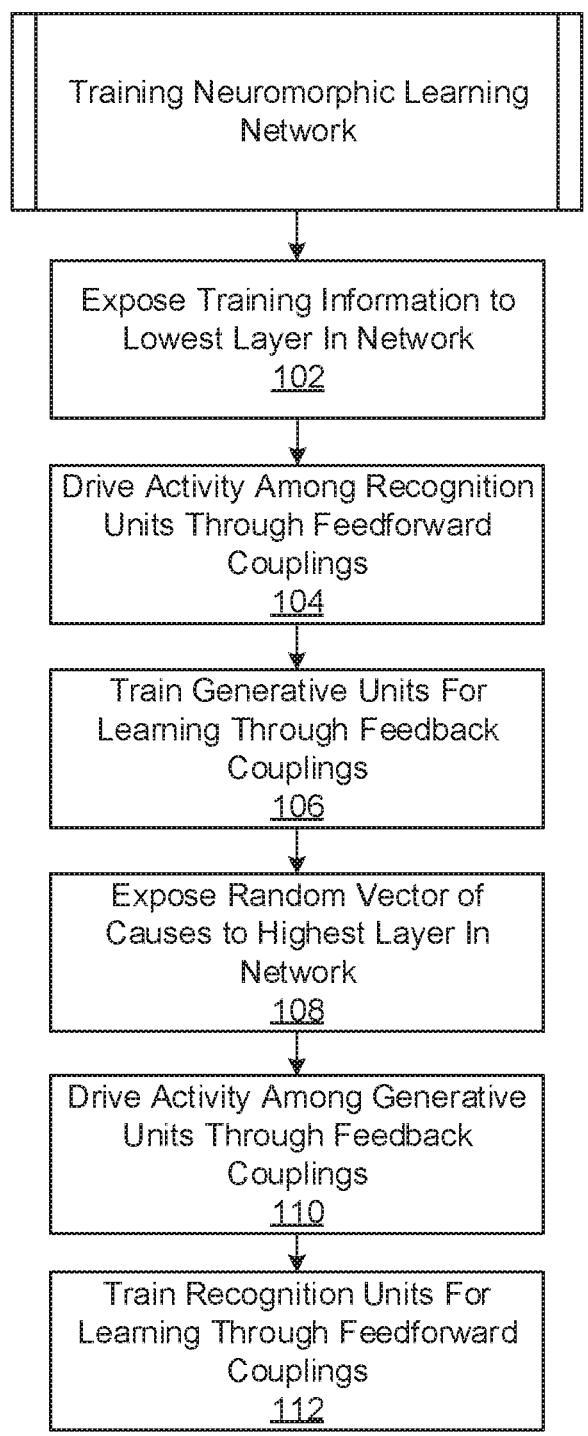
FIG. 6 illustrates an example process for training the neuromorphic circuit network shown in FIGS. 4 and 5 according to various examples described herein.

FIG. 6 illustrates an example process for training the neuromorphic circuit network shown in FIGS. 4 and 5 according to various examples described herein. The process diagram shown in FIG. 6 provides one example of a sequence of steps that can be used for training a neuromorphic circuit network. The arrangement of the steps shown in FIG. 6 is provided by way of representative example with reference to the neuromorphic circuit network shown in FIGS. 4 and 5, but the steps could be used for training other types of neuromorphic circuit networks. The order of the steps can also differ from that depicted. For example, an order of execution of two or more of the steps can be scrambled relative to the order shown. Also, in some cases, two or more of the steps can be performed concurrently or with partial concurrence, and one or more of the steps can be skipped or omitted. Further, the process can loop or continue for a certain period of time until the training has reached a suitable threshold or goal of a learning rule or algorithm, such as the delta rule, for example.

Starting at step 102, the process includes exposing training information to the lowest layer in a neuromorphic circuit network, where the neuromorphic circuit network includes a number of neuromorphic circuit nodes. Referring to the neuromorphic circuit network 100 shown in FIGS. 4 and 5 as an example, the controller 200 can expose or show training examples to the lowest layer in the neuromorphic circuit network 100 (e.g., nodes 50, 51, etc.) at step 102. The training examples can include any suitable information for training the neuromorphic circuit network 100.

At step 104, the process includes driving activity among recognition neuron units in the neuromorphic circuit nodes through feedforward couplings. For example, the activity among the recognition neurons Ra, Rb, and Rc in FIG. 5, which can be encoded as an amplitude in each of the recognition neurons Ra, Rb, and Rc, can be driven up the neuromorphic circuit network 100 through the feedforward couplings 80, 81, etc.

At step 106, the process includes training generative neuron units in the plurality of neuromorphic circuit nodes for learning through feedback couplings. With reference to FIG. 5 as an example, each of the generative neurons Gc, Gb, and Ga are trained for learning at step 106. The generative neuron Gc can be trained for learning using the delta rule described herein based on the activity level of the recognition neuron Rc, with the recognition neuron Rc acting as the target for training. Similarly, the generative neuron Gb can be trained for learning based on the activity level of the recognition neuron Rb, with the recognition neuron Rb acting as the target for training, and the generative neuron Ga can be trained for learning using based on the activity level of the recognition neuron Ra, with the recognition neuron Ra acting as the target for training.

In some cases, one or more of steps 102, 104, and 106 can be executed concurrently or with partial concurrence in a first phase (e.g., a wake phase) or mode of operation. To the extent necessary, the controller 200 can direct the operations of the training for the neuromorphic circuit network 100 during steps 102, 104, and 106.

Turning to step 108, the process includes exposing a random vector of causes to the highest layer in the network. Referring to the neuromorphic circuit network 100 shown in FIGS. 4 and 5 as an example, the controller 200 can expose or show the random vector of causes to the highest layer in the neuromorphic circuit network 100 (e.g., nodes 70, 71, etc.) at step 108. The random vector of causes can include any suitable random information or data.

With the random vector of causes exposed, the process includes driving activity among the generative neuron units through the feedback couplings at step 110. Here, during a second phase (e.g., a sleep phase) or mode of operation, the opposite of the wake phase occurs. The generative neurons Gc, Gb, and Ga are used to drive activity down the neuromorphic circuit network 100 at step 110 through the feedback couplings 90, 91, etc. Further, at step 112, the recognition neurons Ra, Rb, and Rc are trained to reproduce this activity in the neuromorphic circuit network 100 through the feedforward couplings 80, 81, etc.

In some cases, one or more of steps 108, 110, and 112 can be executed concurrently or with partial concurrence in a second phase (e.g., a sleep phase) or mode of operation. To the extent necessary, the controller 200 can direct the operations of the training for the neuromorphic circuit network 100 during steps 108, 110, and 112. Further, the process can loop or continue for a certain period of time, for example, such as until the training has reached a suitable threshold or goal.

The controller 200 can include at least one processing circuit. The processing circuit can include one or more processors and one or more storage devices coupled to each other via local, internal interfaces. The storage devices can store data or components that are executable by the one or more processors of the processing circuit.

The controller 200 and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, ASICs having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

Therefore, the following is claimed:

1. A neuromorphic circuit learning network, comprising:
    a plurality of oscillatory-based neuromorphic circuit nodes, each oscillatory-based neuromorphic circuit node including a recognition neuron unit and a generative neuron unit;
    a plurality of neuromorphic circuit feedforward couplings between the recognition neuron units in the oscillatory-based neuromorphic circuit nodes, wherein a neuromorphic circuit feedforward coupling comprises a pair of memristors arranged in parallel and coupled between a pair of recognition neuron units of the oscillatory-based neuromorphic circuit nodes, wherein a resistance of the pair of memristors of the neuromorphic circuit feedforward coupling is modified based upon a relative phase of oscillating waveform outputs of the pair of recognition neuron units of the oscillatory-based neuromorphic circuit nodes;
    a plurality of neuromorphic circuit feedback couplings between the generative neuron units in the oscillatory-based neuromorphic circuit nodes, wherein a neuromorphic circuit feedback coupling comprises a pair of memristors arranged in parallel and coupled between a pair of generative neuron units of the oscillatory-based neuromorphic circuit nodes, wherein a resistance of the pair of memristors of the neuromorphic circuit feedforward coupling is modified based upon a relative phase of oscillating waveform outputs of the pair of generative neuron units of the oscillatory-based neuromorphic circuit nodes; and
    a controller configured, in a first mode, to:
        drive activity among the recognition neuron units through the neuromorphic circuit feedforward couplings and their pairs of memristors; and
        train the generative neuron units for learning through the neuromorphic circuit feedback couplings based on the activity among the recognition neuron units, wherein feedback memristive weights in the neuromorphic circuit feedback couplings are modified by changing neuromorphic circuit node relative phases of oscillating voltage signals across the feedback memristive weights.

2. The neuromorphic circuit learning network according to claim 1, wherein the activity is encoded as an amplitude of an oscillating voltage signal.

3. The neuromorphic circuit learning network according to claim 2, wherein the controller is further configured, in a second mode, to:
    drive activity among the generative neuron units through the neuromorphic circuit feedback couplings; and
    train the recognition neuron units for learning through the neuromorphic circuit feedforward couplings.

4. The neuromorphic circuit learning network according to claim 3, wherein the controller is further configured, in the second mode, to train the recognition neuron units for learning based on the activity among the generative neuron units, wherein feedforward memristive weights in the neuromorphic circuit feedforward couplings are modified by changing the neuromorphic circuit node relative phases of oscillating voltage signals across the feedforward memristive weights.

5. The neuromorphic circuit learning network according to claim 1, wherein:
    the plurality of oscillatory-based neuromorphic circuit nodes form a number of layers in the neuromorphic circuit learning network; and
    in the first mode, a training example is shown to a lowest layer in the neuromorphic circuit learning network.

6. The neuromorphic circuit learning network according to claim 3, wherein:
    the plurality of oscillatory-based neuromorphic circuit nodes form a number of layers in the neuromorphic circuit learning network; and
    in the second mode, a random vector is shown to a highest layer in the neuromorphic circuit learning network.

7. The neuromorphic circuit learning network according to claim 4, wherein the controller is further configured to train the feedforward memristive weights and the feedback memristive weights for operation as an autoencoder.

8. The neuromorphic circuit learning network according to claim 1, wherein at least one of the plurality of neuromorphic circuit feedforward couplings or at least one of the plurality of neuromorphic circuit feedback couplings comprises:
- a long-term potentiation (LTP) memristor arranged in parallel with a long-term depression (LTD) memristor; and
- a difference amplifier that generates a difference signal based on a difference between output signals from the LTP memristor and the LTD memristor.

9. A neuromorphic circuit learning network, comprising:
- a plurality of oscillatory-based neuromorphic circuit nodes, each neuromorphic circuit node including a recognition neuron unit and a generative neuron unit;
- a plurality of neuromorphic circuit feedforward couplings between the recognition neuron units in the oscillatory-based neuromorphic circuit nodes, wherein an individual neuromorphic circuit feedforward coupling comprises a pair of memristors arranged in parallel and coupled between a pair of recognition neuron units of the oscillatory-based neuromorphic circuit nodes;
- a plurality of neuromorphic circuit feedback couplings between the generative neuron units in the oscillatory-based neuromorphic circuit nodes, wherein an individual neuromorphic circuit feedback coupling comprises a pair of memristors arranged in parallel and coupled between a pair of generative neuron units of the oscillatory-based neuromorphic circuit nodes; and
- a controller configured to drive activity among the recognition neuron units in the neuromorphic circuit feedforward couplings and their pairs of memristors and train the generative neuron units for learning in the neuromorphic circuit feedback couplings based on the activity among the recognition neuron units in the neuromorphic circuit feedforward couplings, wherein the activity is encoded as an amplitude of an oscillating voltage signal and memristive weights in the plurality of neuromorphic circuit feedback couplings are modified by changing a relative phase of oscillating voltage signals across the memristive weights in the neuromorphic circuit feedback couplings.

10. The neuromorphic circuit learning network according to claim 9, wherein the controller is further configured to drive activity among the generative neuron units and train the recognition neuron units for learning.

11. The neuromorphic circuit learning network according to claim 9, wherein the controller is further configured, in a second mode, to train the recognition neuron units for learning through the neuromorphic circuit feedforward couplings.

12. The neuromorphic circuit learning network according to claim 9, wherein at least one of the pair of memristors comprises:
- a long-term potentiation (LTP) memristor arranged in parallel with a long-term depression (LTD) memristor; and
- a difference amplifier that generates a difference signal based on a difference between output signals from the LTP memristor and the LTD memristor.

13. A method of training a neuromorphic circuit learning network, comprising, in a first mode:
- driving activity among recognition neuron units in a plurality of oscillatory-based neuromorphic circuit nodes through feedforward couplings in the oscillatory-based neuromorphic circuit nodes and their pairs of memristors based on relative phases of oscillating voltage signals across feedforward memristive weights in the feedforward couplings, wherein an individual feedforward coupling comprises a pair of memristors arranged in parallel and coupled between a pair of recognition neuron units of the oscillatory-based neuromorphic circuit nodes, wherein the activity is encoded as an amplitude of an oscillating voltage signal; and
- training generative neuron units in the plurality of oscillatory-based neuromorphic circuit nodes for learning through feedback couplings in the oscillatory-based neuromorphic circuit nodes based on the activity among the recognition neuron units through the feedforward couplings, wherein an individual feedback coupling comprises a pair of memristors arranged in parallel and coupled between a pair of recognition neuron units of the oscillatory-based neuromorphic circuit nodes, wherein feedback memristive weights in the feedback couplings are modified by changing a relative phase of oscillating voltage signals across the feedback memristive weights in the feedback couplings.

14. The method of training a neuromorphic circuit learning network according to claim 13, further comprising, in a second mode:
- driving activity among the generative neuron units in the oscillatory-based neuromorphic circuit nodes through the feedback couplings; and
- training the recognition neuron units for learning through the feedforward couplings.

15. The method of training a neuromorphic circuit learning network according to claim 13, wherein:
- the oscillatory-based neuromorphic circuit nodes form a number of layers in the neuromorphic circuit learning network; and
- the method further comprises showing a training example to a lowest layer in the neuromorphic circuit learning network in the first mode.

16. The method of training a neuromorphic circuit learning network according to claim 14, wherein:
- the oscillatory-based neuromorphic circuit nodes form a number of layers in the neuromorphic circuit learning network; and
- the method further comprises showing a random vector to a highest layer in the neuromorphic circuit learning network in the second mode.

17. The neuromorphic circuit learning network according to claim 1, wherein the oscillating voltage signals are sine wave signals.

18. The neuromorphic circuit learning network according to claim 9, wherein the oscillating voltage signals are sine wave signals.

19. The method of training a neuromorphic circuit learning network according to claim 13, wherein the oscillating voltage signals are sine wave signals.

* * * * *